US010261607B2

(12) United States Patent
Lu et al.

(10) Patent No.: US 10,261,607 B2
(45) Date of Patent: Apr. 16, 2019

(54) PORTABLE ELECTRONIC DEVICE AND CONTROL METHOD THEREOF (71) Applicants: Ming-Shun Lu, Taipei (TW); Ming-Chung Liu, Taipei (TW); Wen-Yi Chiu, Taipei (TW); Ting-Wei Wu, Taipei (TW); Yuan-Li Shen, Taipei (TW)

(72) Inventors: Ming-Shun Lu, Taipei (TW); Ming-Chung Liu, Taipei (TW); Wen-Yi Chiu, Taipei (TW); Ting-Wei Wu, Taipei (TW); Yuan-Li Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 381 days.

(21) Appl. No.: 15/168,264

(22) Filed: May 31, 2016

(65) Prior Publication Data

US 2016/0349861 A1 Dec. 1, 2016

Related U.S. Application Data (60) Provisional application No. 62/168,919, filed on Jun. 1, 2015.

(51) Int. Cl.
*G06F 3/0362* (2013.01)
*G06F 1/16* (2006.01)
(Continued)

(52) U.S. Cl.
CPC ........... *G06F 3/0362* (2013.01); *G04C 3/005* (2013.01); *G06F 1/1613* (2013.01); *G06F 3/04847* (2013.01); *G04G 21/08* (2013.01)

(58) Field of Classification Search
CPC .. G06F 3/0362; G06F 3/04847; G06F 1/1613; G04G 21/08; G04G 21/00
See application file for complete search history.

(56) References Cited

U.S. PATENT DOCUMENTS

2007/0247976 A1* 10/2007 Capozzi ............... G04G 9/0064
368/82
2008/0197195 A1* 8/2008 Miller .................. G06K 7/0004
235/440

FOREIGN PATENT DOCUMENTS

CN 102063051 7/2013
TW I457962 10/2014

OTHER PUBLICATIONS

"Office Action of Taiwan Counterpart Application", dated Mar. 17, 2017, p. 1-p. 7.

* cited by examiner

*Primary Examiner* — Premal R Patel
(74) *Attorney, Agent, or Firm* — JCIPRNET (57) ABSTRACT A portable electronic device and a control method thereof are provided. The method is adapted to a portable electronic device including a rotatable element, a fixed element, a screen, a processor, a switch module with at least two protruding elements, and fixed points. The rotatable element is nearby the fixed element. The protruding elements and the fixed points are facing to each other and configured at one and the other of the rotatable element and the fixed element. The processor is coupled to the switch module and the screen. The method includes to display a default user interface corresponding to a default mode on the screen, to determine a corresponding mode according to all press states of each protruding element in the switch module by the processor when the rotatable element is rotated due to an (Continued)

external force applied thereto, and to display a corresponding user interface on the screen.

26 Claims, 5 Drawing Sheets

(51) Int. Cl.
*G06F 3/0484* (2013.01)
*G04C 3/00* (2006.01)
*G04G 21/08* (2010.01)

PORTABLE ELECTRONIC DEVICE AND CONTROL METHOD THEREOF

CROSS-REFERENCE TO RELATED APPLICATION

This application claims the priority benefits of U.S. provisional application Ser. No. 62/168,919, filed on Jun. 1, 2015. The entirety of the above-mentioned patent application is hereby incorporated by reference herein and made a part of this specification.

TECHNICAL FIELD

The invention relates to a portable electronic device, in particular to, a portable electronic device and a control method thereof.

BACKGROUND

To accommodate people's busy lifestyles, portable electronic devices such as smart phones, tabular computers, and laptop computers have become indispensable. As an example, a smart phone equipped with a touch screen may not only include each feature provided by a traditional communication device, but may also serve as a mini personal computer that carries out versatile tasks such as document editing, e-mail serving, web serving, multimedia playing, photo shooting, and instant communication, and thus its usage has surpassed all the other electronic devices.

Since such portable electronic devices are still developed towards multifunctional applications to fulfill consumers' needs, wearable electronic devices such as a smart watch has become a continuously developing product nowadays. Despite of the wearability and mobile application that have been brought by the smart watch, its operation has been restricted due to its volume and screen size. Hence, to enhance its operational convenience under volume and size constraints is a problem to be solved by the developers.

SUMMARY OF THE DISCLOSURE

Accordingly, the invention provides a portable electronic device and a control method thereof, where the user is allowed to operate in a restricted operating area of a portable electronic device subject to low manufacturing cost constraints in an intuitive fashion.

A control method of a portable electronic device is proposed in the invention. The method is adapted to a portable electronic device including a rotatable element, a fixed element, a screen, a processor, a switch module with at least two protruding elements, and fixed points. The rotatable element is nearby the fixed element. The protruding elements are disposed on one of the rotatable element and the fixed element, wherein the fixed points are disposed on the other one of the rotatable element and the fixed element and facing to the protruding elements. The processor is coupled to the switch module and the screen. First, a default user interface corresponding to a default mode is displayed on the screen. An external force is received by the rotatable element to change a relative position of at least one of the protruding elements with respect to the fixed points. When the protruding elements and the fixed points interfere with each other such that each of the protruding elements corresponding to the rotatable element or the fixed element on which the fixed points are disposed has a press state, a corresponding mode is determined according to all the press states of the protruding elements of the switch module and a corresponding user interface of the corresponding mode is displayed on the screen by the processor.

According to an embodiment of the invention, the number of the fixed points is greater than that of the protruding elements.

According to an embodiment of the invention, each of the press states is respectively an on state or an off state.

According to an embodiment of the invention, each of the protruding elements is made of elastic material, and each of the press states respectively corresponds to whether the protruding element is deformed or not.

According to an embodiment of the invention, state groups formed by the press states respectively corresponding to different modes, and the step to determine the corresponding mode according to all the press states of the protruding elements of the switch module includes to respectively determine whether the press state of each of the protruding elements associated with the fixed point is on or off so as to obtain a determined result of the press states, to determine the state group corresponding to the press states according to the determined result, and thereby to determine the corresponding mode.

According to an embodiment of the invention, different total numbers of the press states being on respectively correspond to different modes, and the step to determine the corresponding mode according to all the press states of the protruding elements of the switch module includes to respectively determine whether the press state of each of the protruding elements associated with the fixed point is on or off so as to obtain a determined result of the press states, to accumulate the total number of the press states being on, and thereby to determine the corresponding mode.

A portable electronic device including a rotatable element, a fixed element, a screen, a switch module with at least two protruding elements, fixed points, and a processor is proposed in the invention. The rotatable element is nearby the fixed element. The protruding elements are disposed on one of the rotatable element and the fixed element, wherein the fixed points are disposed on the other one of the rotatable element and the fixed element and facing to the protruding elements. The processor is coupled to the switch module and the screen and is configured to display a default user interface corresponding to a default mode on the screen. When the rotatable element receives an external force to rotate so as to cause a change of a relative position of at least one of the protruding elements with respect to the fixed points and to cause the protruding elements and the fixed points to interfere with each other, each of the protruding elements corresponding to the rotatable element or the fixed element on which the fixed points are disposed has a press state. The processor is also configured to determine a corresponding mode according to all the press states of the protruding elements of the switch module and display a corresponding user interface of the corresponding mode on the screen.

According to an embodiment of the invention, state groups formed by the press states respectively correspond to different modes. While the rotatable element is rotating, the processor respectively determines whether the press state of each of the protruding elements associated with the fixed point is on or off so as to obtain a determined result of the press states, determines the state group corresponding to the press states according to the determined result, and thereby determines the corresponding mode.

According to an embodiment of the invention, different total numbers of the press states being on respectively correspond to different modes. While the rotatable element is rotating, the processor respectively determines whether the press state of each of the protruding elements associated with the fixed point is on or off so as to obtain a determined result of the press states, accumulates the total number of the press states being on, and thereby determines the corresponding mode.

According to an embodiment of the invention, each of the fixed points is a recess. For each of the protruding elements, while the rotatable element is rotating, the press state associated with the protruding element is on when the protruding element is engaged into any one of the fixed points, and the press state associated with the protruding element is off when the protruding element is not engaged into any of the fixed points.

According to an embodiment of the invention, for each of the protruding elements, when the protruding element is engaged into any of the fixed points to cause the press state associated with the protruding element to be on, a ratio of a radius of the protruding element to an engaging depth of the protruding element is within a valid engaging range.

According to an embodiment of the invention, the at least one switch module includes a first switch module and a second switch module, where a radius of the protruding elements of the first switch module is different from that of the protruding elements of the second switch module. For each of the protruding elements of the first switch module, when the protruding element is engaged into any of the fixed points to cause the press state associated with the protruding element to be the on state, a ratio of the radius of the protruding element to an engaging depth of the protruding element is within a first valid engaging range. For each of the protruding elements of the second switch module, when the protruding element is engaged into any of the fixed points to cause the press state associated with the protruding element to be the on state, a ratio of the radius of the protruding element to an engaging depth of the protruding element is within a second valid engaging range, where the second valid engaging range is different from the first valid engaging range.

According to an embodiment of the invention, a ratio of a radius of each of the protruding elements to a radius of each of the recesses is within a valid rotating range.

According to an embodiment of the invention, the protruding elements are disposed on the fixed element, and the fixed points are disposed on the rotatable element. The press state associated with each of the protruding elements is generated as the fixed points are rotated along with the rotatable element.

According to an embodiment of the invention, the protruding elements are disposed on the rotatable element, and the fixed points are disposed on the fixed element. The press state associated with each of the protruding elements is generated as the protruding elements are rotated along with the rotatable element.

According to an embodiment of the invention, the protruding elements are made of metal material.

According to an embodiment of the invention, the portable electronic device is a smart watch, where the rotatable element is a watch bezel, and the fixed element is a watch body.

In summary, in the proposed portable electronic device and its control method, press states of at least two of the protruding elements associated with the fixed points are generated through the rotation of the rotatable element, and a corresponding mode could be determined based on all the press states so as to display a corresponding user interface.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Some embodiments of the disclosure will now be described more fully hereinafter with reference to the accompanying drawings, in which some, but not all embodiments of the application are shown. Like reference numerals refer to like elements throughout. Indeed, various embodiments of the disclosure may be embodied in many different forms and should not be construed as limited to the embodiments set forth herein; rather, these embodiments are provided so that this disclosure will satisfy applicable legal requirements.

Figure 1:
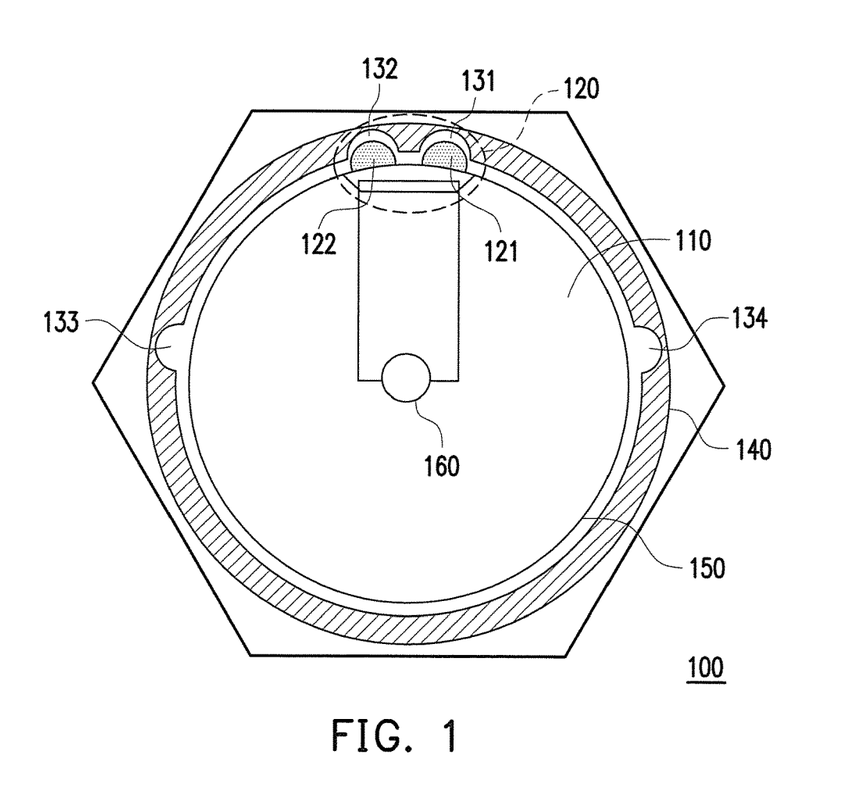
FIG. 1 illustrates a schematic diagram of a portable electronic device in accordance with an embodiment of the disclosure.

FIG. 1 illustrates a schematic diagram of a portable electronic device in accordance with an embodiment of the disclosure. All components of the portable electronic device and their configurations are first introduced in FIG. 1. The functionalities of the components are disclosed in more detail in conjunction with FIG. 2.

Referring to FIG. 1, a portable electronic device 100 includes a screen 110, a switch module 120 including protruding elements 121 and 122, fixed points 131-134, a rotatable element 140, a fixed element 150, and a processor 160. In the present embodiment, the portable electronic device 100 could be any portable electronic device such as a laptop computer, a tabular computer, a personal digital assistant, a smart watch, a smart phone, a digital media player, a digital camera, and so forth. The invention is not limited in this regard.

The screen 110 is configured to display output images of the portable electronic device 100 for the user. In the present embodiment, the screen 110 could be a liquid crystal display (LCD), a light-emitting diode (LED) display, a field emission display (FED) or other types of displays. The invention is not limited in this regard. In another embodiment, the screen 110 could also be a display integrated with touch detection components, which may provide a display feature as well as an input feature.

The switch module 120 is formed by two or more protruding elements. The protruding elements correspond to multiple fixed points, where the number of the fixed points is more than that of the protruding elements. For simplicity purposes, the two protruding elements 121, 122 and the four fixed points 131-134 would only be illustrated. The implementation of other amounts of protruding elements and fixed points could be deduced in a similar fashion.

The protruding elements 121, 122 are disposed on one of the rotatable element 140 and the fixed element 150. The fixed points 131-134 are disposed on the other one of the rotatable element 140 and the fixed element 150 and facing to the protruding elements 121, 122. The rotatable element 140 is nearby the fixed element 150 and could be disposed, for example, on top of the fixed elements 150. While the rotatable elements 140 is rotating due to an external force, the fixed points 131-134 and the protruding elements 121, 122 would interfere with each other, and each of the protruding elements 121, 122 corresponding to the rotatable element 140 or the fixed element 150 on which the fixed points 131-134 are disposed has a press state. That is, the rotation of the rotatable element 140 would change a corresponding relationship between the protruding elements 121, 122 and the fixed points 131-134, and the press states of the protruding elements 121, 122 would be thereby changed. To be specific, when the protruding elements 121, 122 are disposed on the rotatable element 140 and the fixed points 131-134 are disposed on the fixed element 150, the protruding elements 121, 122 would be rotated along with the rotatable element 140 to generate different press states. On the other hand, when the protruding elements 121, 122 are disposed on the fixed element 150 and the fixed points 131-134 are disposed on the rotatable element 140, the fixed points 131-134 would be rotated along with the rotatable element 140 to cause the protruding elements 121, 122 to generate different press states.

In the present embodiment, the protruding elements 121, 122 could be the same size and made of metal material which ensures minimal wear and tear. The fixed points 131-134 could be recesses with the same size so that each press state could be determined based on the engagement between the protruding elements 121, 122 and the fixed points 131-134. A ratio of a radius of each of the protruding elements 121, 122 to that of each of the fixed points 131-134 would be within a valid rotating range so that the rotatable element 140 could rotate easily and yet sufficient forces are provided between the protruding elements 121, 122 and the fixed points 131-134 in order to avoid unintentional touches. For example, the valid rotating range could be $$0.8 \le R = \frac{R1}{R2} \le 1.2,$$

where R1 denotes the radius of each of the fixed points 131-134, R2 denotes the radius of each of the protruding elements 121, 122, and R is the ratio of R1 to R2.

The processor 160 is coupled to the screen 110 and the switch module 120 and would obtain a press state according to a press level of each of the protruding elements 121, 122 of the switch module 120, where the press state is either an on state or an off state. The determination of the on state is that a ratio of the radius of the protruding element 121, 122 to a depth of the protruding element 121, 122 being engaged into any of the fixed points 131-134 is within a valid engaging range. For example, such valid engaging range could be R2≥P and $$1 \le \frac{R2}{P} \le 3.5,$$

where P denotes the depth of the protruding element 121, 122 being engaged into any of the fixed points 131-134. Moreover, the processor 160 would determine a corresponding mode according to the press states of the protruding element 121, 122 so as to switch a display image of the screen 110. In another embodiment, the protruding elements 121, 122 could be made of elastic material, and its press state respectively corresponds to whether it is deformed or not. The processor 160 could be a central processing unit (CPU), or other programmable devices for general purpose or special purpose such as a microprocessor and a digital signal processor (DSP), a programmable controller, a control chip, an application specific integrated circuit (ASIC), a programmable logic device (PLD) or other similar devices or a combination of above-mentioned devices.

Moreover, in an embodiment, the processor 160 and the screen 110 could be disposed on the fixed elements 150. In another embodiment, the processor 160 could be disposed on the fixed elements 150, and the screen is disposed on top of the rotatable element 140 or between the rotatable element 140 and the fixed element 150. The invention is not limited in this regard.

Figure 2:
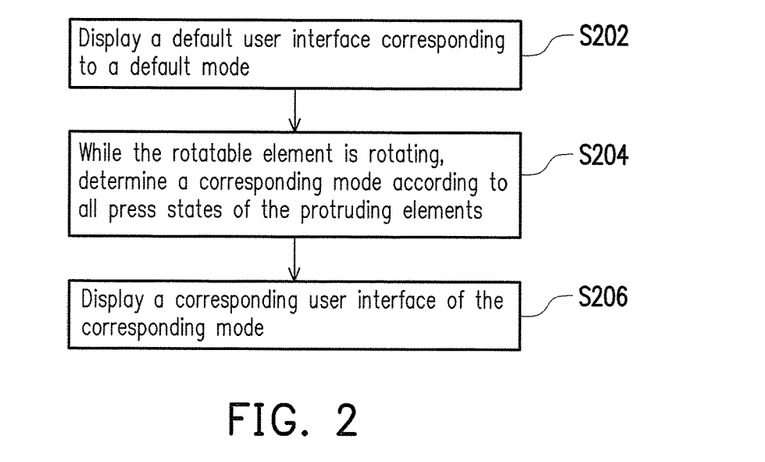
FIG. 2 illustrates a flowchart of a control method of the portable electronic device in accordance with an embodiment of the disclosure.

FIG. 2 illustrates a flowchart of a control method of the portable electronic device 100 in accordance with an embodiment of the disclosure. The portable electronic device 100 in the present embodiment provides a multi-mode control, and each mode corresponds to a different user interface. The flow herein would demonstrate how to control the portable electronic device 100 for mode switching by rotating the rotatable element 140. Detailed steps of the control method would be illustrated along with each component of the portable electronic device 100. For simplicity purposes, assume that the fixed points 131-134 are disposed on the rotatable elements 140, and the protruding elements 121, 122 are disposed on the fixed element 150.

Referring to both FIG. 1 and FIG. 2, the processor 160 of the portable electronic device 100 would display a default user interface corresponding to a default mode on the screen 110 (Step S202). In other words, when the portable electronic device 100 is in the default mode, the screen 110 would display the default user interface. Such default mode could be a mode previously used by the portable electronic device 100, a default setting of a system, or a setting preset by the user. The invention is not limited in this regard.

Next, while the rotatable element 140 is rotating, the processor 160 would determine a corresponding mode according to all press states of the protruding elements 121, 122 associated with the fixed points 131-134 (Step S204) and display a corresponding user interface of the corresponding mode on the screen 110 (Step S206). To be specific, the fixed points 131-134 are rotated along with the rotatable element 140 to cause the protruding elements 121, 122 to generate different press states. For example, while the rotatable element 140 is rotating, if the protruding element 121 is engaged into any of the fixed points 131-134, the processor 160 would detect that the press state of the protruding element 121 is on. Meanwhile, if the protruding element 122 is not engaged into any of the fixed pints 131-134, the processor 160 would detect that the press state of the protruding element 122 is off. The processor 160 would determine a corresponding mode according to the press states of both the protruding elements 121, 122 and switch to a user interface corresponding to the determined mode from the default user interface originally displayed on the screen 110.

The way that the processor 160 determines a mode corresponding to the press states of the protruding elements 121, 122 could be based on a state group formed by all of the press states or a total number of on states, and would be respectively illustrated in the first embodiment and the second embodiment. The portable electronic device 100 would be a wearable electronic device such as a smart watch in the following embodiments, where the rotatable element 140 is a watch bezel, a fixed element 150 is a watch body, and the protruding elements 121, 122 are disposed on the rotatable element 140.

In the first embodiment, the press states of the protruding elements 121, 122 could form four state groups and respectively correspond to four modes. The processor 160 would determine whether the press state of each of the protruding elements 121, 122 is on or off so as to obtain a determination result of all the press states, and then determine the corresponding state group according to the determination result and thereby determine the corresponding mode. Herein, a lookup table similar to Table 1 could be prestored in a memory (not shown), and the processor 116 would look up the corresponding mode according to the determination result of the press states of the protruding elements 121 and 122.

TABLE 1

| protruding element 121 | protruding element 122 | corresponding mode | corresponding user interface |
| --- | --- | --- | --- |
| on | on | first mode: simplified mode | first user interface |
| on | off | second mode: dynamic mode (red light) | second user interface |
| off | off | third mode: dynamic mode (blue light) | third user interface |
| off | on | fourth mode: normal mode | fourth user interface |

Figure 3A:
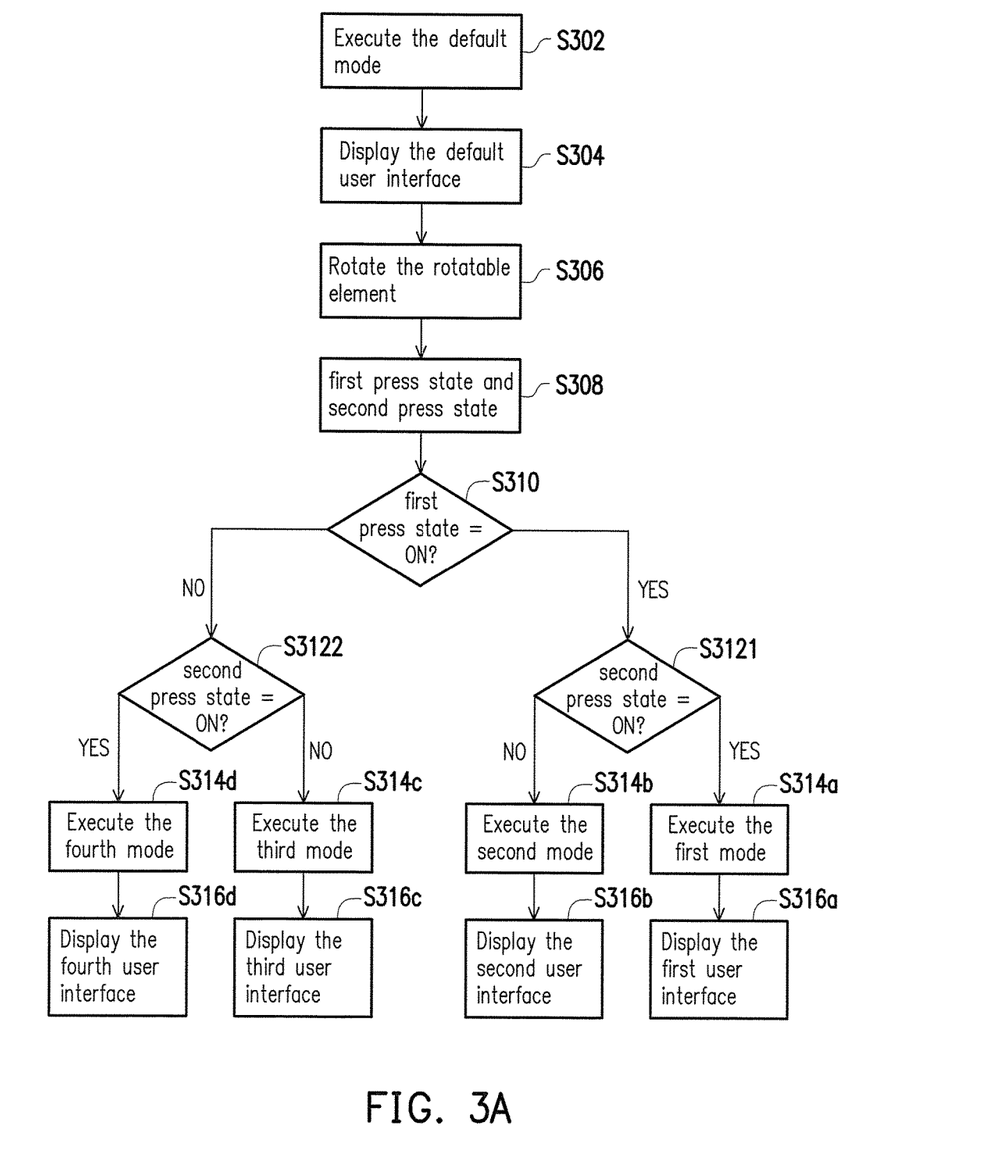
FIG. 3A illustrates a flowchart of a control method of the portable electronic device according to the first embodiment of the invention.
Figure 3B:
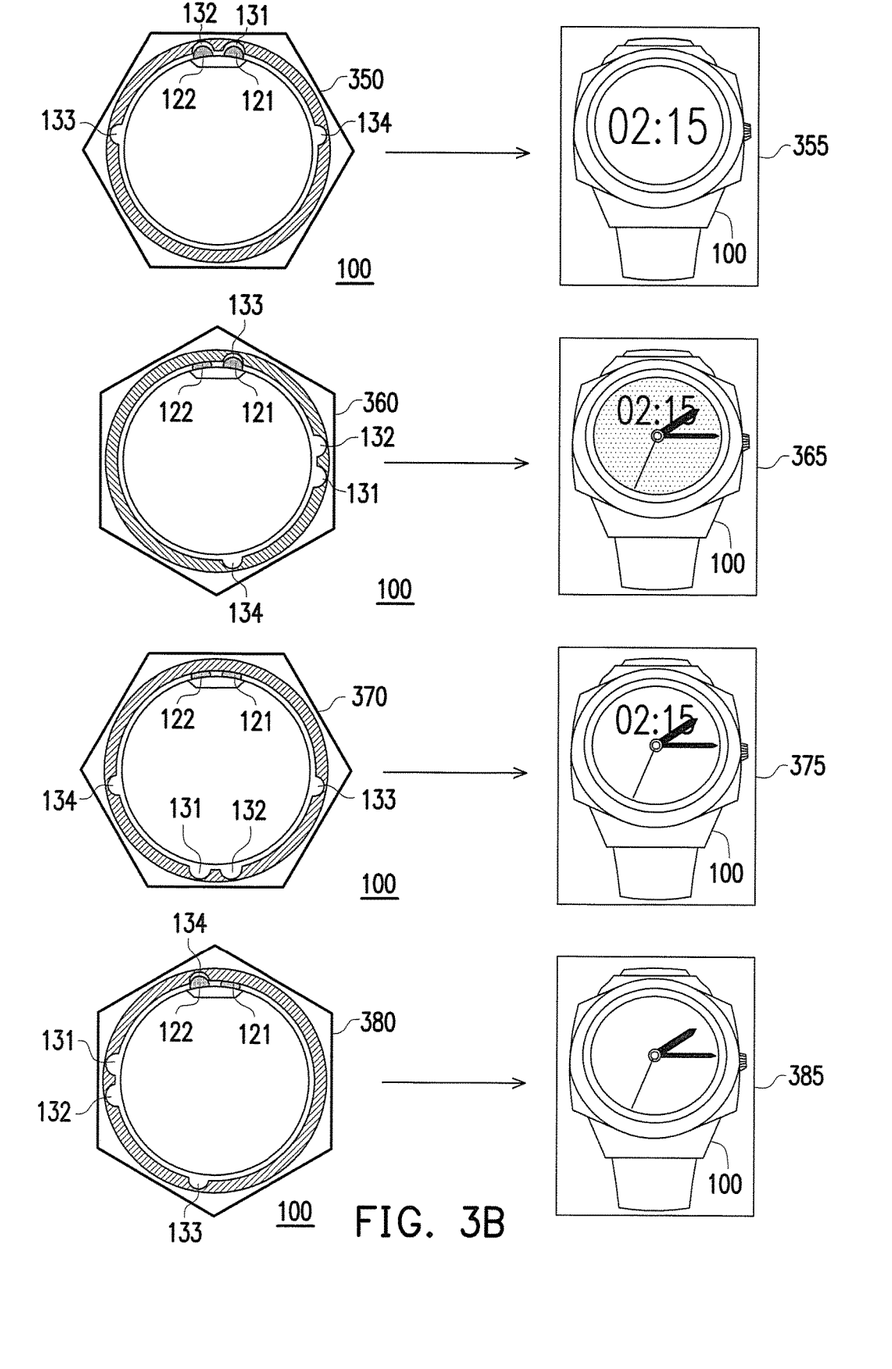
FIG. 3B illustrates a schematic diagram of a control method of the portable electronic device according to the first embodiment of the invention.

In detail, FIG. 3A illustrates a flowchart of a control method of the portable electronic device 100 according to the first embodiment of the invention, and FIG. 3B illustrates a schematic diagram of a control method of the portable electronic device 100 according to the first embodiment of the invention.

Referring to FIG. 1, FIG. 3A and FIG. 3B, the processor 160 of the portable electronic device 100 would first execute the default mode (Step S302) and display the default user interface on the screen 110 (Step S304). While the rotatable element 140 is rotating to cause presses generated between the protruding elements 121, 122 and the fixed pints 131-134 (Step S306), the protruding elements 121, 122 would be respectively in a first press state and a second press state (Step S308). The processor 160 would determine whether the first press state of the protruding element 121 is on (Step S310) and then determine whether the second press state of the protruding element 122 is also on (Step S3121, S3122).

To be specific, as illustrated in FIG. 3B, the fixed points 131, 132 could be disposed nearby, and the fixed points 133, 134 could be disposed at certain distances away from the fixed points 131, 132 so that the rotatable element 140 would be able to rotate to four different rotation states 350, 360, 370, and 380 so as to generate four different groups of press states. The illustrated rotation states 350, 360, 370 and 380 are sorted in a clockwise rotating direction of the rotatable element 140. However, the rotating direction of the rotatable element 140 is not limited in the invention.

When the first press state and the second press state are both on, the processor 160 would execute the first mode (Step S314a) and display the first user interface on the screen 110 (Step S316a). As an example in FIG. 3B, when the rotatable element 140 rotates to the rotation state 350, the protruding elements 121, 122 would be respectively engaged into the fixed points 131, 132. Meanwhile, the first press state and the second press state are both on, and the processor 160 would switch to a user interface 355 of the simplified mode from the mode originally displayed on the screen 110 according to Table 1.

When the first press state is on and the second press state is off, the processor 160 would execute the second mode (Step S314b) and display the second user interface on the screen 110 (Step S316b). As an example in FIG. 3B, when the rotatable element 140 rotates to the rotation state 360, the protruding element 121 would be engaged into the fixed point 133 and the protruding element 122 would not be engaged into any of the fixed points 131-134. Hence, the first press state is on and the second press state is off, and the processor 160 would switch to a user interface 365 of the red-light dynamic mode from the mode originally displayed on the screen 110 according to Table 1.

When the first press state and the second press state are both off, the processor 160 would execute the third mode (Step S314c) and display the third user interface on the screen 110 (Step S316c). As an example in FIG. 3B, when the rotatable element 140 rotates to the rotation state 370, the protruding elements 121, 122 would not be engaged into any of the fixed points 131-134. Meanwhile, the first press state and the second press state are both off, and the processor 160 would switch to a user interface 375 of the blue-light dynamic mode from the mode originally displayed on the screen 110 according to Table 1.

When the first press state is off and the second press state is on, the processor 160 would execute the fourth mode (Step S314d) and display the fourth user interface on the screen 110 (Step S316d). As an example in FIG. 3D, when the rotatable element 140 rotates to the rotation state 380, the protruding element 122 would be engaged into the fixed point 134 and the protruding element 121 would not be engaged into any of the fixed points 131-134. Hence, the first press state is off and the second press state is on, and the processor 160 would switch to a user interface 385 of the normal mode from the mode originally displayed on the screen 110 according to Table 1.

In the second embodiment, the total number of the press states generated by the protruding elements 121, 122 being on could be two, one, or zero and respectively corresponds to three modes. The processor 160 would determine whether the press state of each of the protruding elements 121, 122 is on so as to obtain a determination result of all the press states, and then accumulate the total number of on states according to the determination result and thereby determine the corresponding mode. Herein, a lookup table similar to Table 2 could be prestored in a memory (not shown), and the processor 116 would look up the corresponding mode according to the total number of the press states of the protruding elements 121 and 122 being on.

TABLE 2

| Total number | corresponding mode | corresponding user interface |
|---|---|---|
| 2 | first mode: simplified mode | first user interface |
| 1 | second mode: dynamic mode | second user interface |
| 0 | third mode: normal mode | third user interface |

Figure 4A:
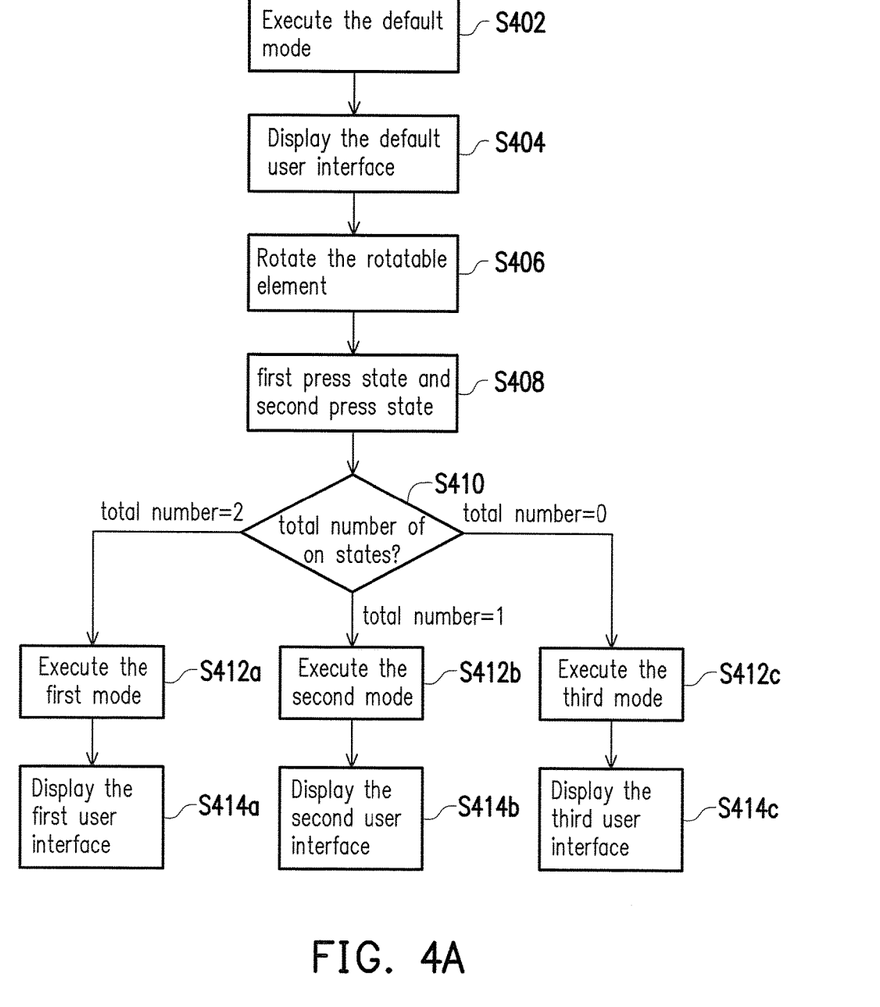
FIG. 4A illustrates a flowchart of a control method of the portable electronic device according to the second embodiment of the invention.
Figure 4B:
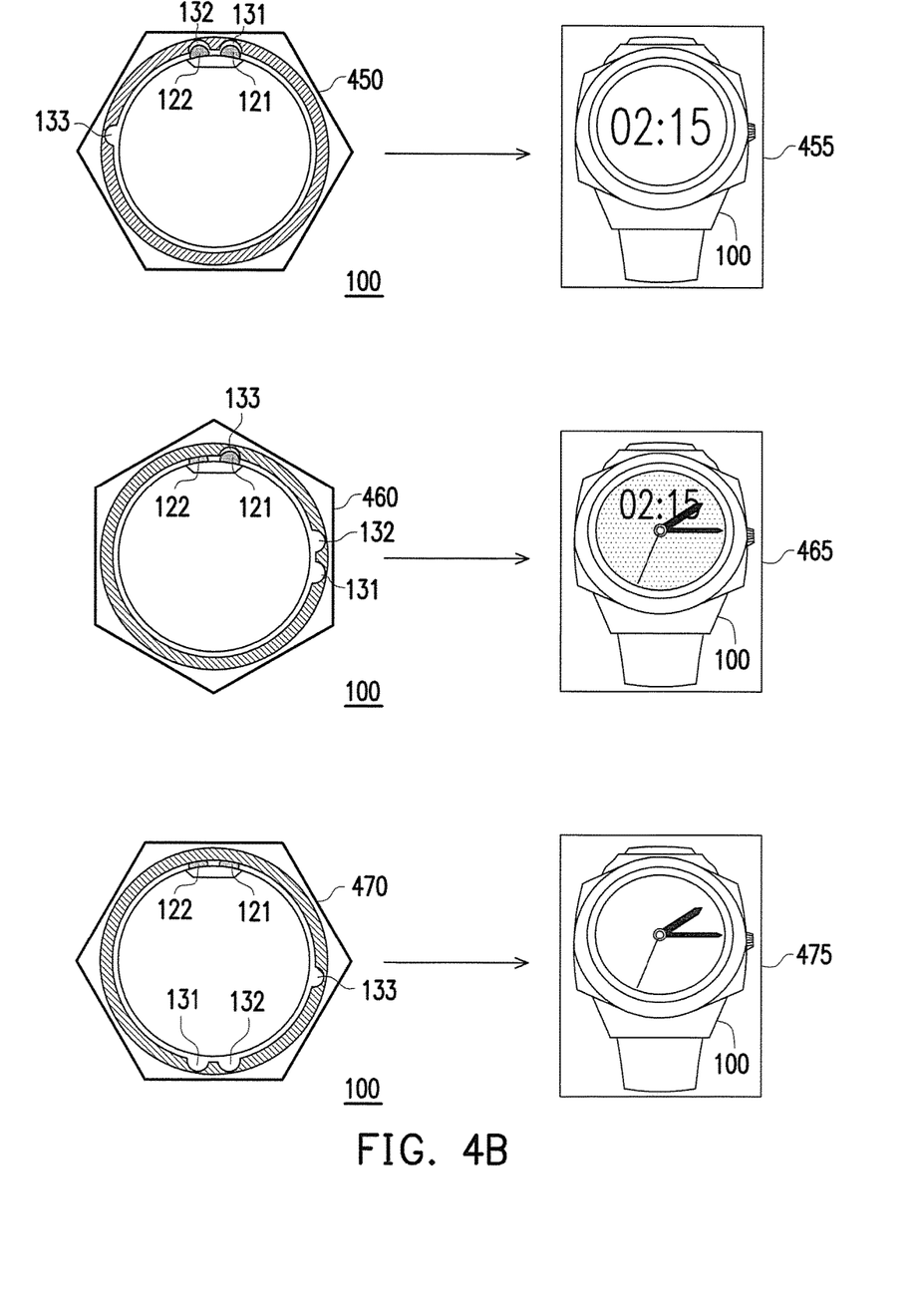
FIG. 4B illustrates a schematic diagram of a control method of the portable electronic device according to the second embodiment of the invention.

In detail, FIG. 4A illustrates a flowchart of a control method of the portable electronic device 100 according to the second embodiment of the invention, and FIG. 4B illustrates a schematic diagram of a control method of the portable electronic device 100 according to the second embodiment of the invention.

Referring to FIG. 1, FIG. 4A, and FIG. 4B, the processor 160 of the portable electronic device 100 would first execute the default mode (Step S402) and display the default user interface on the screen 110 (Step S404). While the rotatable element 140 is rotating to cause presses being generated between the protruding elements 121, 122 and the fixed pints 131-134 (Step S406), the protruding elements 121, 122 would be respectively in a first press state and a second press state (Step S408). The processor 160 would accumulate a total number of the first press state and the second press state being on (Step S410).

It should be noted that, as illustrated in FIG. 4B, the three fixed points 131, 132, and 133 would be used in the present embodiment, where the fixed points 131, 132 could be disposed nearby, and the fixed point 133 could be disposed at certain distances away from the fixed points 131, 132 so that the rotatable element 140 would be able to rotate to three different rotation states 450, 460, and 470 so as to generate three different total numbers of on states. The illustrated rotation states 450, 460, and 470 are sorted in a clockwise rotating direction of the rotatable element 140. However, the rotating direction of the rotatable element 140 is not limited in the invention.

When the total number of on states is two, the processor 160 would execute the first mode (Step S412a) and display the first user interface on the screen 110 (Step S414a). As an example in FIG. 4B, when the rotatable element 140 rotates to the rotation state 450, the protruding elements 121, 122 would be respectively engaged into the fixed points 131, 132. Meanwhile, the first press state and the second press state are both on, and the total number of on states is thus two. The processor 160 would switch to a user interface 455 of the simplified mode from the mode originally displayed on the screen 110 according to Table 2.

When the total number of on states is one, the processor 160 would execute the second mode (Step S412b) and display the second user interface on the screen 110 (Step S414b). As an example illustrated in FIG. 4B, when the rotatable element 140 rotates to the rotation state 460, the protruding element 121 would be engaged into the fixed point 133, and the protruding element 122 would not be engaged into any of the fixed points 131-133. Hence, the total number of on states is one. The processor 160 would switch to a user interface 465 of the simplified mode from the mode originally displayed on the screen 110 according to Table 2. It should be noted that, since the processor 160 would determine the mode only based on the total number of on states, as long as one of the protruding elements 121, 122 is engaged into any of the fixed points 131-133 and the other one is not engaged into any of the fixed points 131-133 (i.e. the total number of on states is one), the processor 160 would execute the second mode and display the second user interface on the screen 110.

When the total number of on states is zero, the processor 160 would execute the third mode (Step S412c) and display the third user interface on the screen 110 (Step S414c). As an example in FIG. 4B, when the rotatable element 140 rotates to the rotation state 470, the protruding elements 121, 122 would not be engaged into any of the fixed points 131-134. Hence, the total number of on states is zero. The processor 160 would switch to a user interface 475 of the normal mode from the mode originally displayed on the screen 110 according to Table 2.

Moreover, in another embodiment, switching among three modes could also be attained by disposing only two nearby fixed points, and yet a larger rotation angle would be required for the rotatable element 140 to perform switching.

According to the first embodiment and the second exemplary embedment, the portable electronic device 100 would only require two protruding elements and their corresponding fixed points to perform up to four modes of switching and user interface adjustment. As for the implementation, rotation angles corresponding to different modes could be labelled on the rotatable element 140 to provide the user an intuitive approach to operate the portable electronic device 100.

In another embodiment, the switch module 120 could also include three or more protruding elements. As for mode switching based on state groups, press states generated by three protruding elements could form eight state groups which respectively correspond to eight modes. As for mode switching based on the total number of on states, three protruding elements could generate four different total numbers of on states which respectively correspond to four modes. Hence, by deduction, when the switch module 120 includes n protruding elements, ($2^n$) state groups or (n+1) different total numbers of on states would be generated.

In another embodiment, the portable electronic device 100 could include two or more switch modules, and each of the switch modules also includes at least two protruding elements. In the present embodiment, the protruding elements of different switch modules would have different radiuses and valid engaging ranges so as to determine press states of the protruding elements from different switch modules.

To be specific, assume that the portable electronic device 100 includes a first switch module and a second switch module, where a radius of each protruding element of the first switch module and that of each protruding element of the second switch module are different and respectively within a first valid engaging range and a second valid engaging range. As for each of the protruding elements of the first switch module, the determination of its on state is based on whether a ratio of the radius of the protruding element to the depth of the protruding element engaged into any of the fixed points is within the first valid engaging range. As for each of the protruding elements of the second switch module, the determination of its on state is based on whether a ratio of the radius of the protruding element to the depth of the protruding element engaged into any of the fixed points is within the second valid engaging range. The implementation of three or more switch modules could be deduced in a similar fashion and would not be repeated herein.

In summary, in the proposed portable electronic device and its control method, press states of at least two of the protruding elements associated with the fixed points are generated through the rotation of the rotatable element, and a corresponding mode could be determined based on all the press states so as to display a corresponding user interface.

Hence, the user is allowed to operate in a restricted operating area of a portable electronic device subject to low cost constraint in an intuitive fashion.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A control method of a portable electronic device, wherein the portable electronic device comprises a rotatable element, a fixed element, a screen, a processor, at least one switch module with at least two protruding elements, and a plurality of fixed points, wherein the rotatable element surrounds the fixed element and has an inner annular surface, and the fixed element has an outer annular surface facing the inner annular surface of the rotatable element, wherein the protruding elements are disposed on one of the inner annular surface of the rotatable element and the outer annular surface of the fixed element, wherein the fixed points are disposed on the other one of the inner annular surface of the rotatable element and the outer annular surface of the fixed element and facing to the protruding elements, wherein the processor is coupled to the switch module, and wherein the control method comprises the following steps:

displaying a default user interface corresponding to a default mode on the screen;

receiving an external force by the rotatable element to rotate so as to change a relative position of at least one of the protruding elements the fixed points;

when the protruding elements and the fixed points interfere with each other such that each of the protruding elements corresponding to the rotatable element or the fixed element on which the fixed points are disposed has a press state, determining a corresponding mode according to all the press states of the protruding elements of the switch module by the processor; and displaying a corresponding user interface of the corresponding mode on the screen.

2. The control method according to claim 1, wherein the number of the fixed points is greater than that of the protruding elements.

3. The control method according to claim 1, wherein each of the press states is respectively an on state or an off state.

4. The control method according to claim 1, wherein the protruding element is made of elastic material, and each of the press states respectively corresponds to whether the protruding element is deformed or not.

5. The control method according to claim 1, wherein a plurality of state groups formed by the press states respectively correspond to different modes.

6. The control method according to claim 5, wherein the step of determining the corresponding mode according to all the press states of the protruding elements of the switch module comprises:

respectively determining whether the press state of each of the protruding elements associated with the fixed point is on or off so as to obtain a determined result of the press states; and determining the state group corresponding to the press states according to the determined result and thereby determining the corresponding mode.

7. The control method according to claim 1, wherein different total numbers of the press states being on respectively correspond to different modes.

8. The control method according to claim 7, wherein wherein the step of determining the corresponding mode according to all the press states of the protruding elements of the switch module comprises:

respectively determining whether the press state of each of the protruding elements associated with the fixed point is on or off so as to obtain a determined result of the press states; and accumulating the total number of the press states being on and thereby determining the corresponding mode.

9. The control method according to claim 1, wherein each of the fixed points is a recess, and while the rotatable element is rotating, for each of the protruding elements:

the press state associated with the protruding element is on when the protruding element is engaged into any one of the fixed points; and the press state associated with the protruding element is off when the protruding element is not engaged into any of the fixed points.

10. The control method according to claim 9, wherein for each of the protruding elements, when the protruding element is engaged into any of the fixed points to cause the press state associated with the protruding element to be on, a ratio of a radius of the protruding element to an engaging depth of the protruding element is within a valid engaging range.

11. The control method according to claim 9, wherein the at least one switch module comprises a first switch module and a second switch module, wherein the radius of the protruding elements of the first switch module is different from that of the protruding elements of the second switch module, and wherein:

for each of the protruding elements of the first switch module, when the protruding element is engaged into any of the fixed points to cause the press state associated with the protruding element to be on, a ratio of a radius of the protruding element to an engaging depth of the protruding element is within a first valid engaging range; and for each of the protruding elements of the second switch module, when the protruding element is engaged into any of the fixed points to cause the press state associated with the protruding element to be on, a ratio of a radius of the protruding element to an engaging depth of the protruding element is within a second valid engaging range, wherein the second valid engaging range is different from the first valid engaging range.

12. The control method according to claim 9, wherein a ratio of a radius of each of the protruding elements to a radius of each of the recesses is within a valid rotating range.

13. A portable electronic device comprising:

a fixed element, having an outer annular surface;

a rotatable element, surrounding the fixed element and having an inner annular surface facing the outer annular surface of the fixed element;

at least one switch module, wherein each of the at least one switch module has at least two protruding elements;

a plurality of fixed points, wherein the protruding elements are disposed on one of the inner annular surface of the rotatable element and the outer annular surface of the fixed element, wherein the fixed points are disposed on the other one of the the inner annular surface of rotatable element and the outer annular surface of the fixed element and facing to the protruding elements;
a screen; and
a processor, coupled to the at least one switch module and the screen,
wherein the processor displays a default user interface corresponding to a default mode on the screen,
wherein when the rotatable element receives an external force to rotate so as to cause a change of a relative position of at least one of the protruding elements with respect to the fixed points and to cause the protruding elements and the fixed points to interfere with each other, the processor according to each of the protruding elements corresponding to the rotatable element or the fixed element on which the fixed points are disposed has a press state,
wherein determines a corresponding mode according to all the press states of the protruding elements of the switch module and displays a corresponding user interface of the corresponding mode on the screen.

14. The portable electronic device according to claim 13, wherein the number of the fixed points is greater than that of the protruding elements.

15. The portable electronic device according to claim 13, wherein each of the press states is respectively an on state or an off state.

16. The portable electronic device according to claim 13, wherein each of the protruding elements is made of elastic material, and each of the press states respectively corresponds to whether the protruding element is deformed or not.

17. The portable electronic device according to claim 13, wherein a plurality of state groups formed by the press states respectively correspond to different modes, and wherein while the rotatable element is rotating, the processor respectively determines whether the press state of each of the protruding elements associated with the fixed point is on or off so as to obtain a determined result of the press states, determines the state group corresponding to the press states according to the determined result, and thereby determines the corresponding mode.

18. The portable electronic device according to claim 13, wherein different total numbers of the press states being on respectively correspond to different modes, and wherein while the rotatable element is rotating, the processor respectively determines whether the press state of each of the protruding elements associated with the fixed point is on or off so as to obtain a determined result of the press states, accumulates the total number of the press states being on, and thereby determines the corresponding mode.

19. The portable electronic device according to claim 13, wherein each of the fixed points is a recess, and while the rotatable element is rotating, for each of the protruding elements:
the press state associated with the protruding element is on when the protruding element is engaged into any one of the fixed points; and
the press state associated with the protruding element is off when the protruding element is not engaged into any of the fixed points.

20. The portable electronic device according to claim 19, wherein for each of the protruding elements, when the protruding element is engaged into any of the fixed points to cause the press state associated with the protruding element to be on, a ratio of a radius of the protruding element to an engaging depth of the protruding element is within a valid engaging range.

21. The portable electronic device according to claim 19, wherein the at least one switch module comprises a first switch module and a second switch module, wherein the radius of the protruding elements of the first switch module is different from that of the protruding elements of the second switch module, and wherein:
for each of the protruding elements of the first switch module, when the protruding element is engaged into any of the fixed points to cause the press state associated with the protruding element to be the on state, a ratio of the radius of the protruding element to an engaging depth of the protruding element is within a first valid engaging range; and
for each of the protruding elements of the second switch module, when the protruding element is engaged into any of the fixed points to cause the press state associated with the protruding element to be the on state, a ratio of the radius of the protruding element to an engaging depth of the protruding element is within a second valid engaging range, wherein the second valid engaging range is different from the first valid engaging range.

22. The portable electronic device according to claim 19, wherein a ratio of a radius of each of the protruding elements to a radius of each of the recesses is within a valid rotating range.

23. The portable electronic device according to claim 13, wherein the protruding elements are disposed on the fixed element, and the fixed points are disposed on the rotatable element, and wherein the press state associated with each of the protruding elements is generated as the fixed points are rotated along with the rotatable element.

24. The portable electronic device according to claim 13, wherein the protruding elements are disposed on the rotatable element, and the fixed points are disposed on the fixed element, and wherein the press state associated with each of the protruding elements is generated as the protruding elements are rotated along with the rotatable element.

25. The portable electronic device according to claim 13, wherein the protruding elements are made of metal material.

26. The portable electronic device according to claim 13, wherein the portable electronic device is a smart watch, and wherein the rotatable element is a watch bezel, and the fixed element is a watch body.

* * * * *